(12) United States Patent
Chen

(10) Patent No.: US 11,421,812 B1
(45) Date of Patent: Aug. 23, 2022

(54) THERMALLY INSULATING FIXTURE

(71) Applicant: Wei-Chih Chen, Taichung (TW)

(72) Inventor: Wei-Chih Chen, Taichung (TW)

( * ) Notice: Subject to any disclaimer, the term of this patent is extended or adjusted under 35 U.S.C. 154(b) by 0 days.

(21) Appl. No.: 17/191,930

(22) Filed: Mar. 4, 2021

(51) Int. Cl.
*F16L 59/02* (2006.01)
*F16M 13/02* (2006.01)
*E04B 1/41* (2006.01)
*E04B 1/76* (2006.01)
*E04B 1/38* (2006.01)

(52) U.S. Cl.
CPC .......... *F16L 59/022* (2013.01); *E04B 1/4178* (2013.01); *F16M 13/02* (2013.01); *E04B 1/762* (2013.01); *E04B 2001/405* (2013.01); *E04B 2001/7679* (2013.01)

(58) Field of Classification Search
USPC ........................................................ 248/300
See application file for complete search history.

(56) References Cited

U.S. PATENT DOCUMENTS

| | | | | |
|---|---|---|---|---|
| 4,163,913 A | * | 8/1979 | Barratt | H02K 11/20 310/91 |
| 4,966,565 A | * | 10/1990 | Dohi | H01R 4/029 29/860 |
| 9,318,829 B2 | * | 4/2016 | Yu | H01R 13/18 |
| 9,774,143 B1 | * | 9/2017 | Su | H01R 13/6461 |
| 2004/0099781 A1 | * | 5/2004 | Podue | H04R 1/026 248/300 |

* cited by examiner

*Primary Examiner* — Alfred J Wujciak
(74) *Attorney, Agent, or Firm* — Karin L. Williams; Alan D. Kamrath; Mayer & Williams PC

(57) ABSTRACT

A thermally insulating fixture includes a support bracket, and a thermally insulating member mounted on the support bracket. The support bracket has a middle provided with a sheet plate. The sheet plate includes two hollow portions formed on two ends thereof. Each of the two hollow portions is provided with an abutment laminating the sheet plate. The sheet plate is provided with a through hole. The thermally insulating member covers an exterior of the support bracket. In practice, when the self-tapping screw extends through the through hole of the sheet plate and is screwed and tightened, a force is applied on the abutment. Thus, the abutment reinforces the strength of the support bracket to reduce deformation of the support bracket.

5 Claims, 14 Drawing Sheets

FIG·2

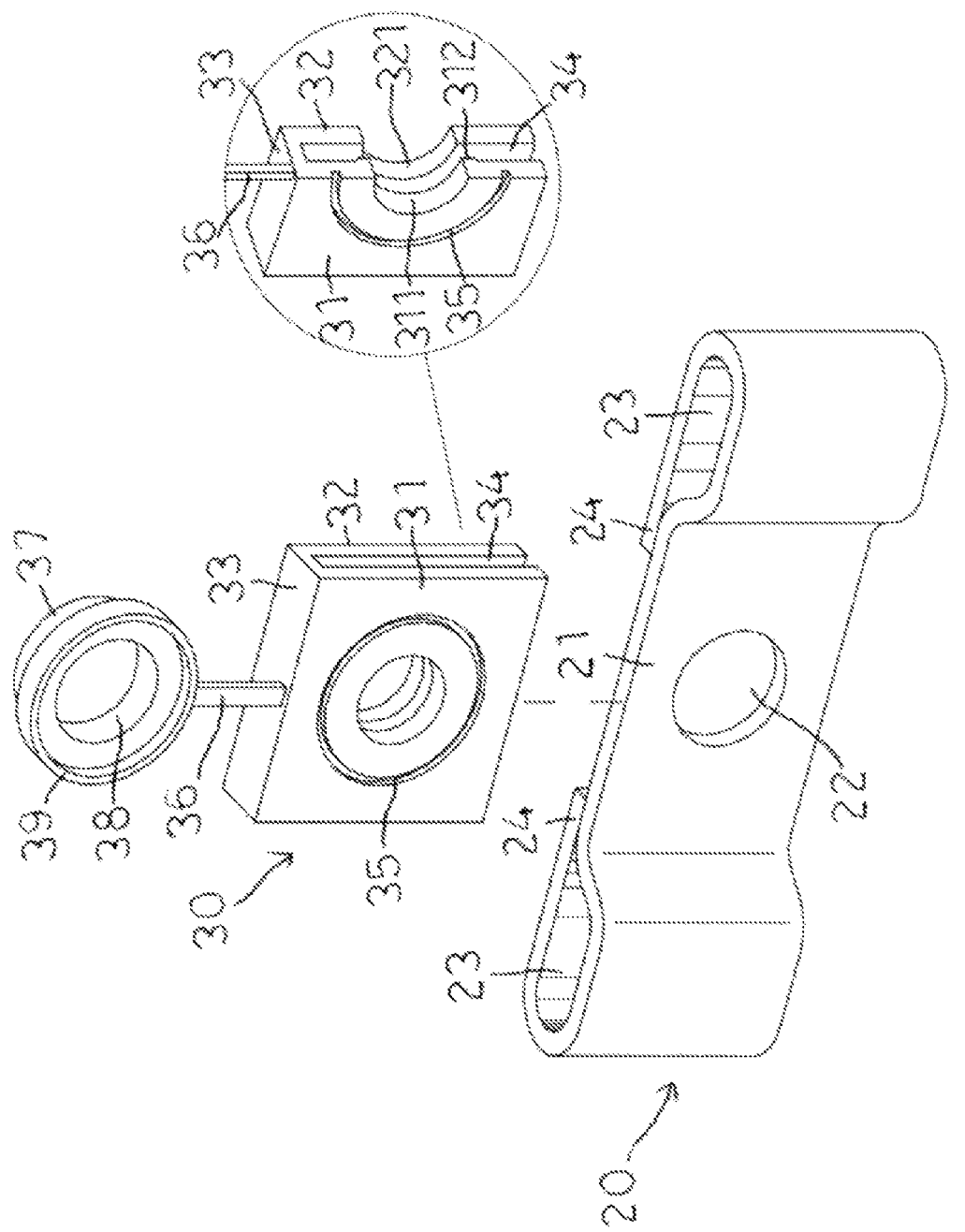

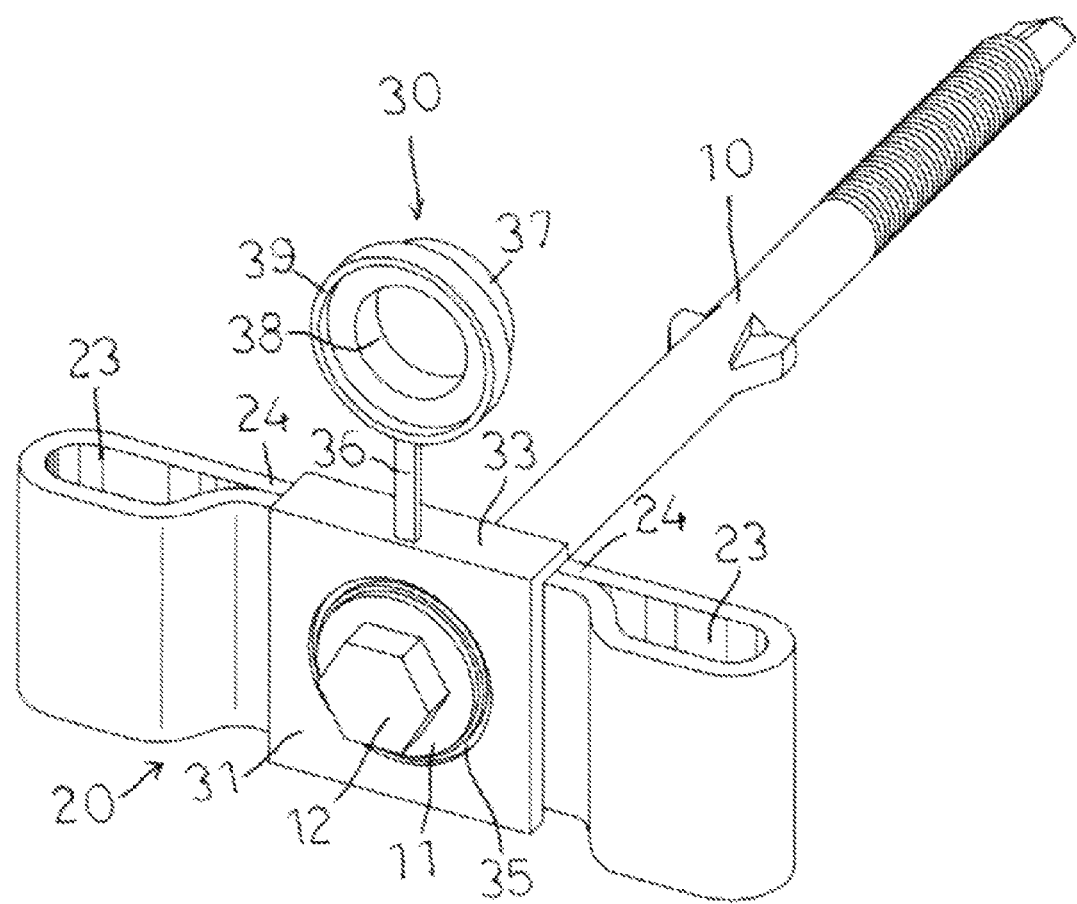
FIG·8

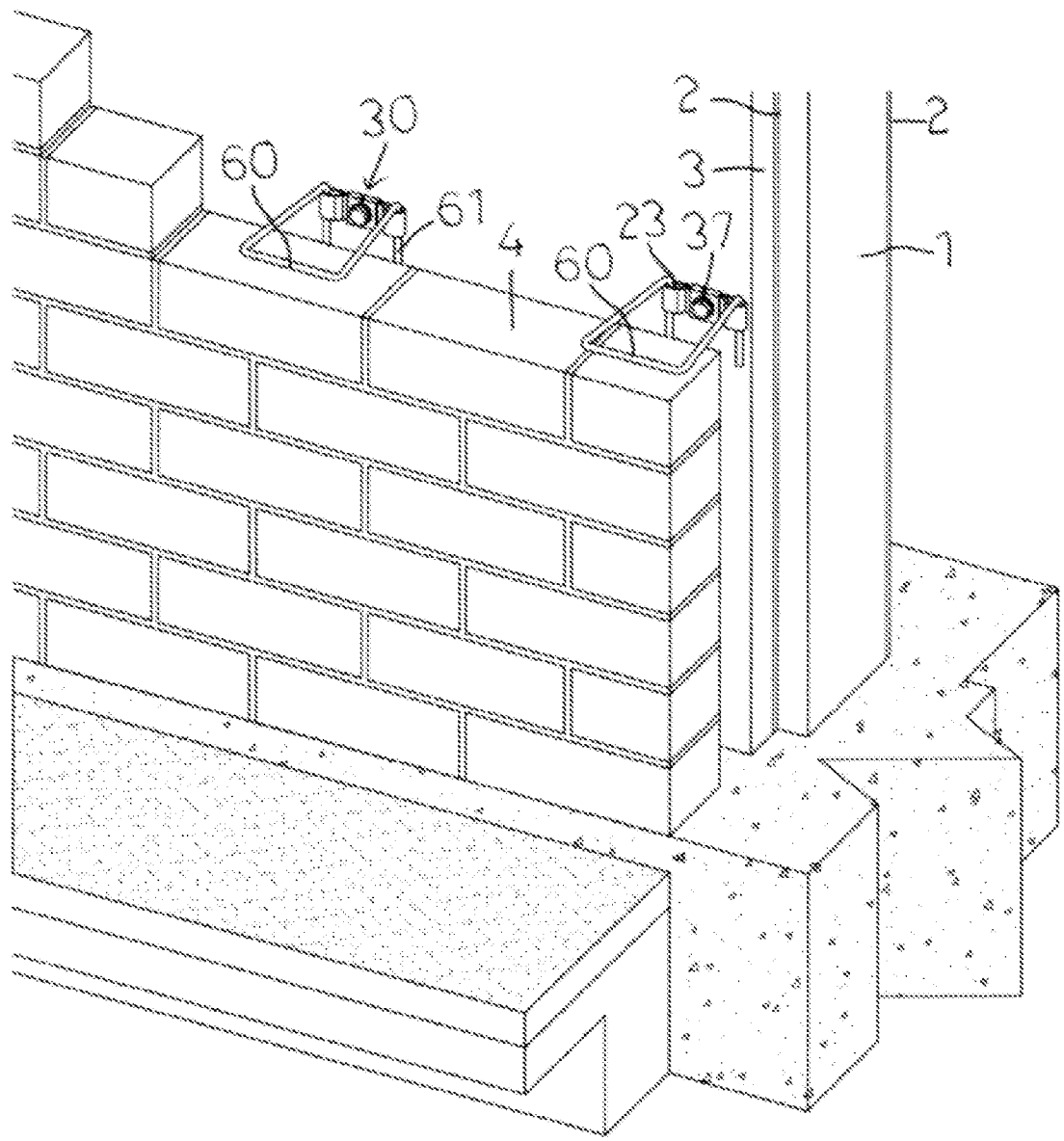
FIG·16

THERMALLY INSULATING FIXTURE

BACKGROUND OF THE INVENTION

1. Field of the Invention

The present invention relates to a fixture and, more particularly, to a thermally insulating fixture.

2. Description of the Related Art

A conventional fixture comprises an L-shaped support bracket and a screw. The support bracket includes a first plate and a second plate. The first plate is provided with a through hole. The second plate is provided with a slot. The screw extends through the through hole and has a first end provided with a washer and a head and a second end provided with a drilling tip and an external thread. The head is driven by a driving tool so as to rotate the screw. However, the support bracket and the screw are exposed outward and cannot provide a thermally insulating function efficiently, so that the cold air in the winter or the hot air in the summer easily permeates through the support bracket and the screw into the house.

A conventional thermal clip comprises a heat isolating wing plate, a heat isolating washer, and a screw. The screw extends through the heat isolating wing plate and the heat isolating washer. The screw has a first end provided with a washer and a head and a second end provided with an external thread and a drilling tip. The head is driven by a driving tool so as to rotate the screw. However, the washer and the head of the screw are still exposed outward and cannot provide a thermally insulating function efficiently, so that the cold air in the winter or the hot air in the summer easily permeates through the washer and the head of the screw into the house. In addition, the heat isolating washer has complicated working procedures, thereby increasing the cost of fabrication.

BRIEF SUMMARY OF THE INVENTION

The primary objective of the present invention is to provide a thermally insulating fixture that provides a thermally insulating effect exactly and efficiently.

In accordance with the present invention, there is provided a thermally insulating fixture comprising a support bracket, and a thermally insulating member mounted on the support bracket. The support bracket has a middle provided with a sheet plate formed by stamping. The sheet plate includes two hollow portions formed on two ends thereof. Each of the two hollow portions has a loop shape and is formed by bending the sheet plate. Each of the two hollow portions is provided with an abutment laminating the sheet plate. The sheet plate is provided with a through hole. The thermally insulating member covers an exterior of the support bracket. In practice, when the self-tapping screw extends through the through hole of the sheet plate and is screwed and tightened, a force is applied on the abutment. Thus, the abutment reinforces the strength of the support bracket to reduce deformation of the support bracket.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

FIG. 7 is an exploded perspective view of a thermally insulating fixture in accordance with the preferred embodiment of the present invention.

FIG. 8 is a perspective assembly view of the thermally insulating fixture in accordance with the preferred embodiment of the present invention.

FIG. 16 is a perspective view of the thermally insulating fixture that is worked for a brick wall under construction.

DETAILED DESCRIPTION OF THE INVENTION

Figure 1:
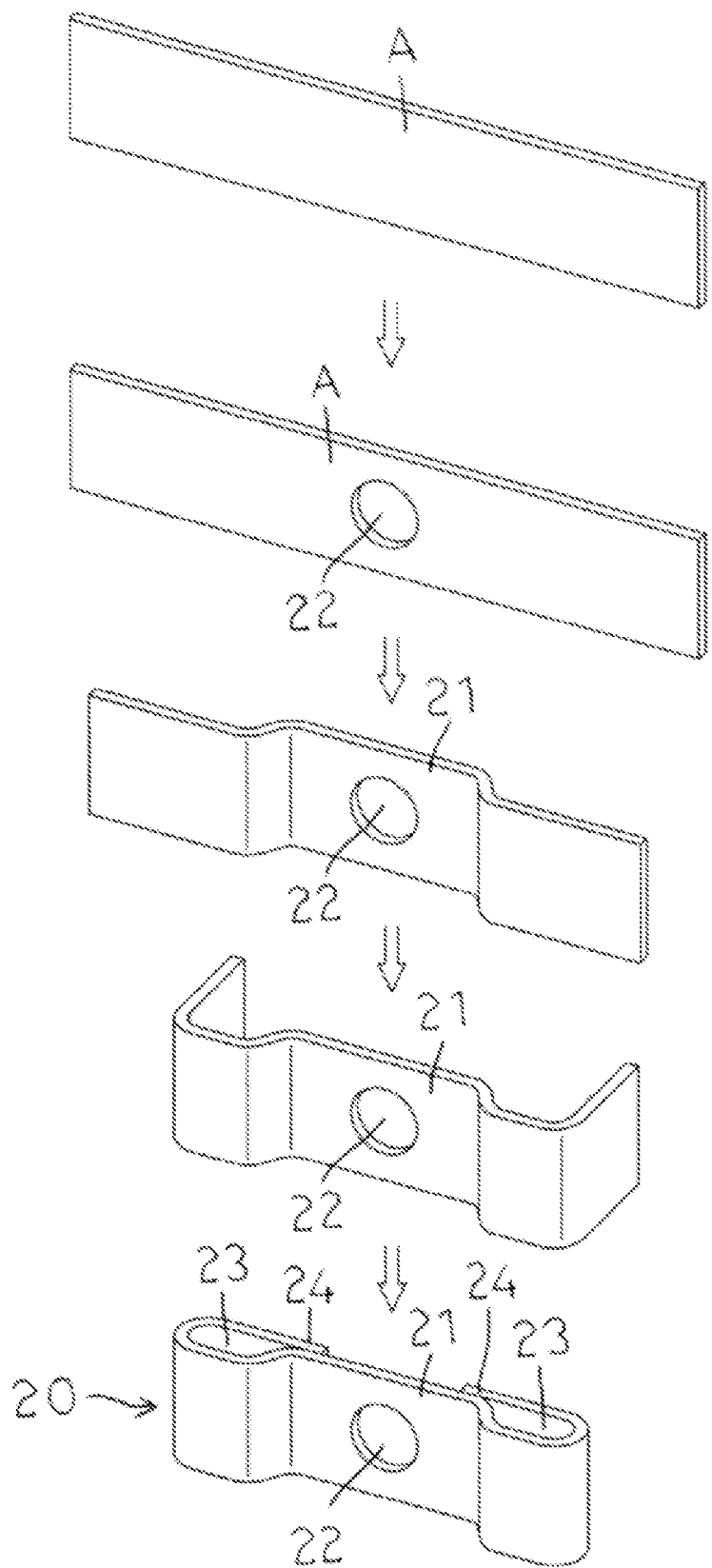
FIG. 1 is a perspective flow chart showing fabrication of a first support bracket in accordance with the preferred embodiment of the present invention.

Referring to the drawings and initially to FIGS. 1-9, a thermally insulating fixture in accordance with the preferred embodiment of the present invention comprises a support bracket 20, and a thermally insulating member 30 mounted on the support bracket 20. The support bracket 20 has a butterfly shape and has a middle provided with a sheet plate 21 formed by stamping or pressing. The sheet plate 21 includes two hollow portions 23 formed on two ends thereof. Each of the two hollow portions 23 has a loop shape and is formed by bending the sheet plate 21. Each of the two hollow portions 23 is provided with an abutment (or extension) 24 laminating the sheet plate 21. The sheet plate 21 has a middle provided with a through hole 22 having a circular shape. The thermally insulating member 30 covers (or coats or wrap) an exterior of the support bracket 20.

The thermally insulating fixture further comprises a self-tapping screw 10, and the support bracket 20 is mounted on the self-tapping screw 10. The self-tapping screw 10 has an upper end provided with a circular washer 11 and a hexagonal screw head 12. The screw head 12 of the self-tapping screw 10 is rotated by a driving tool, such as a pneumatic device or the like, to rotate the self-tapping screw 10. The washer 11 of the self-tapping screw 10 has a diameter greater than that of the through hole 22 of the sheet plate 21. In the preferred embodiment of the present invention, each of the two hollow portions 23 has a flat, triangular, circular or polygonal cross-sectional profile.

Figure 3:
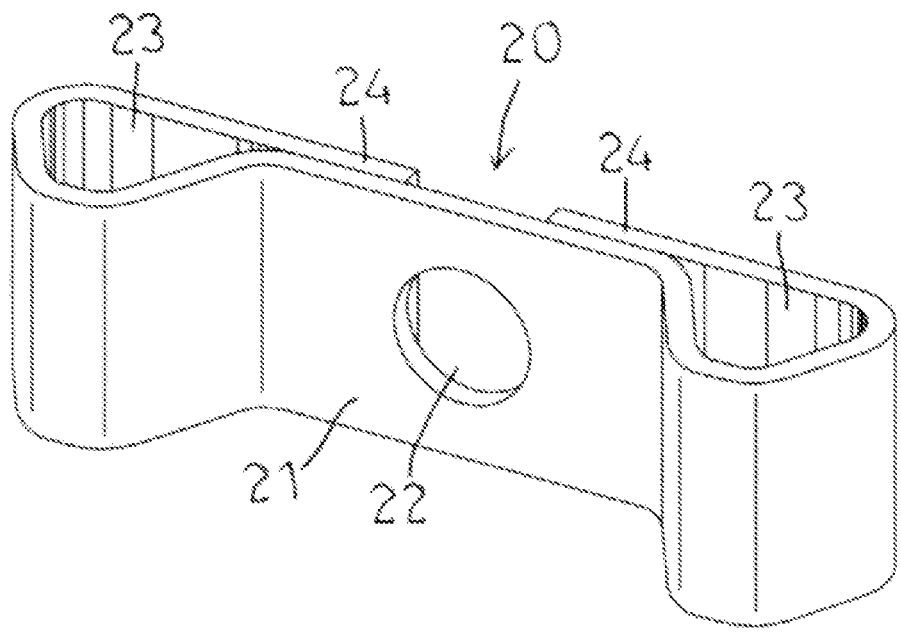
FIG. 3 is a perspective view of the first support bracket in accordance with the preferred embodiment of the present invention.

In the preferred embodiment of the present invention, the two hollow portions 23 are bent and encircled from a front face to a back face of the sheet plate 21 as shown in FIG. 3.

Figure 4:
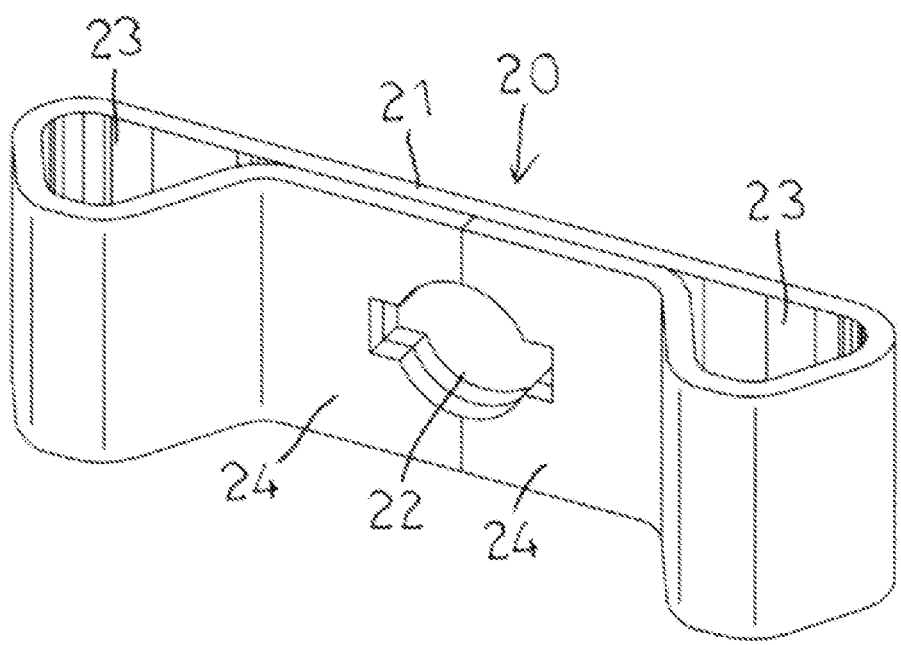
FIG. 4 is a perspective view of the second support bracket in accordance with the preferred embodiment of the present invention.

In the preferred embodiment of the present invention, the two hollow portions 23 are bent and encircled from a back face to a front face of the sheet plate 21 as shown in FIG. 4.

In the preferred embodiment of the present invention, the thermally insulating member 30 is made of plastics or rubber.

Figure 5:
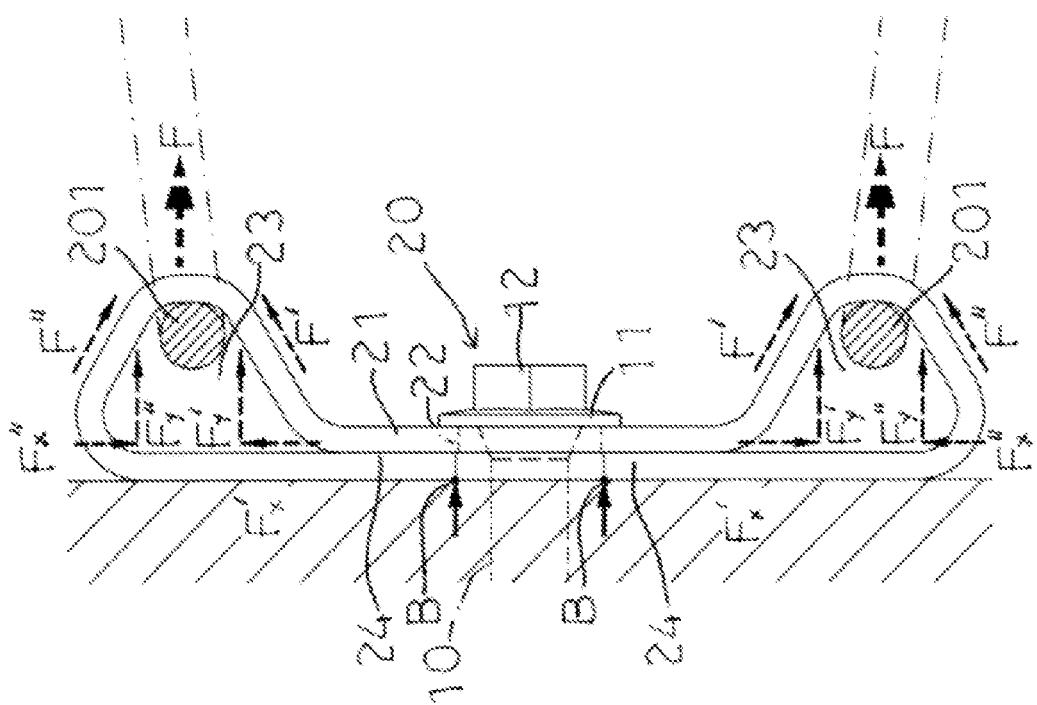
FIG. 5 is a schematic view showing operation of the first support bracket in accordance with the preferred embodiment of the present invention.

In fabrication, referring to FIGS. 1, 3, and 5, the support bracket 20 is made of an iron sheet plate A having the through hole 22. The iron sheet plate A is stamped (or pressed) and bent to form the sheet plate 21. Then, the sheet plate 21 is bent and encircled to form the two hollow portions 23. At this time, the two hollow portions 23 are bent and encircled from the front face to the back face of the sheet plate 21 to form a closed state. Each of the two hollow portions 23 has a distal end provided with the abutment 24 laminating the back face of the sheet plate 21. Thus, the support bracket 20 is worked easily and simply.

In assembly, when the self-tapping screw 10 extends through the through hole 22 of the sheet plate 21 and is screwed and tightened, a forward force is applied on the abutment 24 as indicated by point B in FIG. 5. Thus, the abutment 24 reinforces the strength of the support bracket 20 to reduce deformation of the support bracket 20. At the same time, when the two hollow portions 23 are subjected to a pull force F applied by a pull member 201, each of the two hollow portions 23 is pulled by a first force F' and a second force F'''. The first force F' and the second force F''' are arranged symmetrically. The first force F' is composed of two components $F_x'$ and $F_y'$, and the second force F''' is composed of two components $F_x'''$ and $F_y'''$. Thus, the first force F' and the second force F''' share the pull force F evenly, to prevent the two hollow portions 23 from producing a stress concentration.

Figure 2:
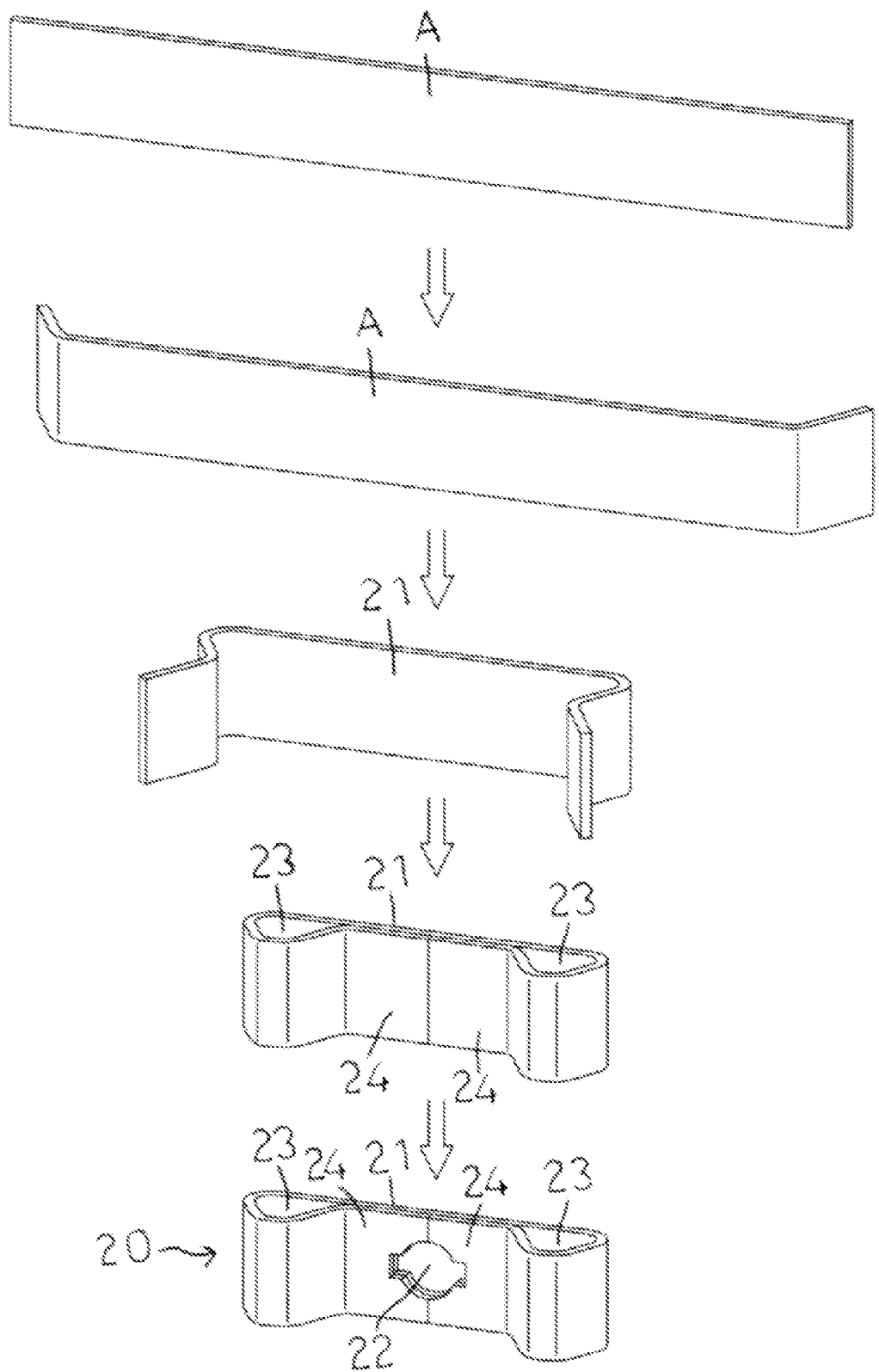
FIG. 2 is a perspective flow chart showing fabrication of a second support bracket in accordance with the preferred embodiment of the present invention.
Figure 6:
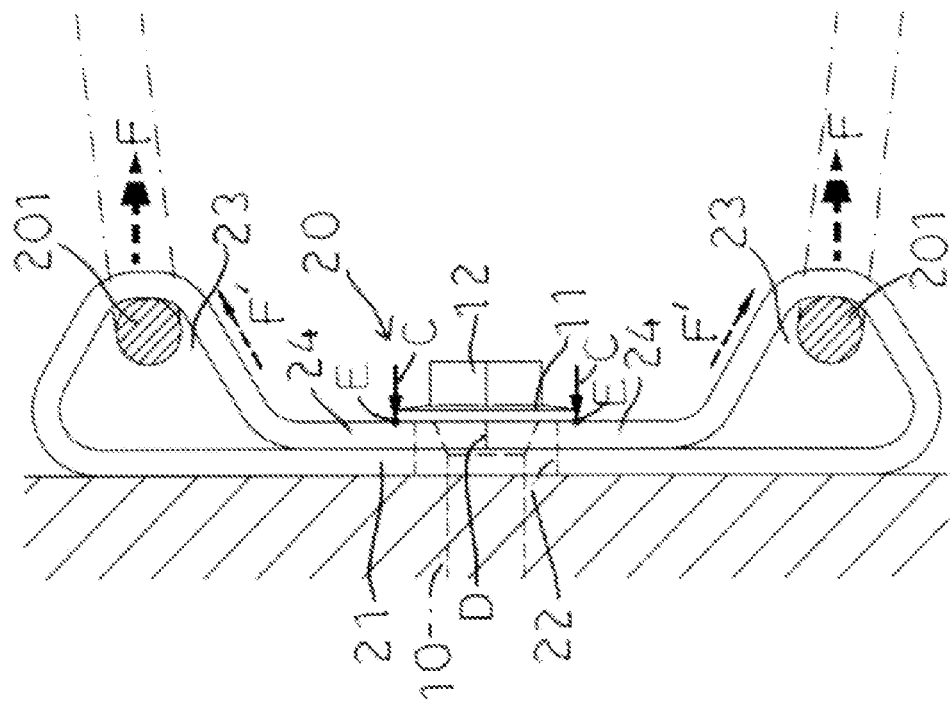
FIG. 6 is a schematic view showing operation of the second support bracket in accordance with the preferred embodiment of the present invention.

Alternatively, referring to FIGS. 2, 4, and 6, the support bracket 20 is made of an iron sheet plate A having the through hole 22. The iron sheet plate A is stamped (or pressed) and bent to form the sheet plate 21. Then, the sheet plate 21 is bent and encircled to form the two hollow portions 23. At this time, the two hollow portions 23 are bent and encircled from the back face to the front face of the sheet plate 21 to form a closed state. Each of the two hollow portions 23 has a distal end provided with the abutment 24 laminating the front face of the sheet plate 21. Thus, the support bracket 20 is worked easily and simply.

In assembly, when the self-tapping screw 10 extends through the through hole 22 of the sheet plate 21 and is screwed and tightened, a backward force is applied on the abutment 24 as indicated by point C in FIG. 6. Thus, the abutment 24 reinforces the strength of the support bracket 20 to reduce deformation of the support bracket 20. At the same time, when the two hollow portions 23 are subjected to a pull force F applied by a pull member 201, the edge (as indicated by point D in FIG. 6) of the abutment 24 is pressed toward the middle and pushes the other side of the abutment 24, so that it is necessary to exert a larger force to deform the abutment 24 at the outside of the fulcrum (as indicated by point E in FIG. 6).

Figure 9:
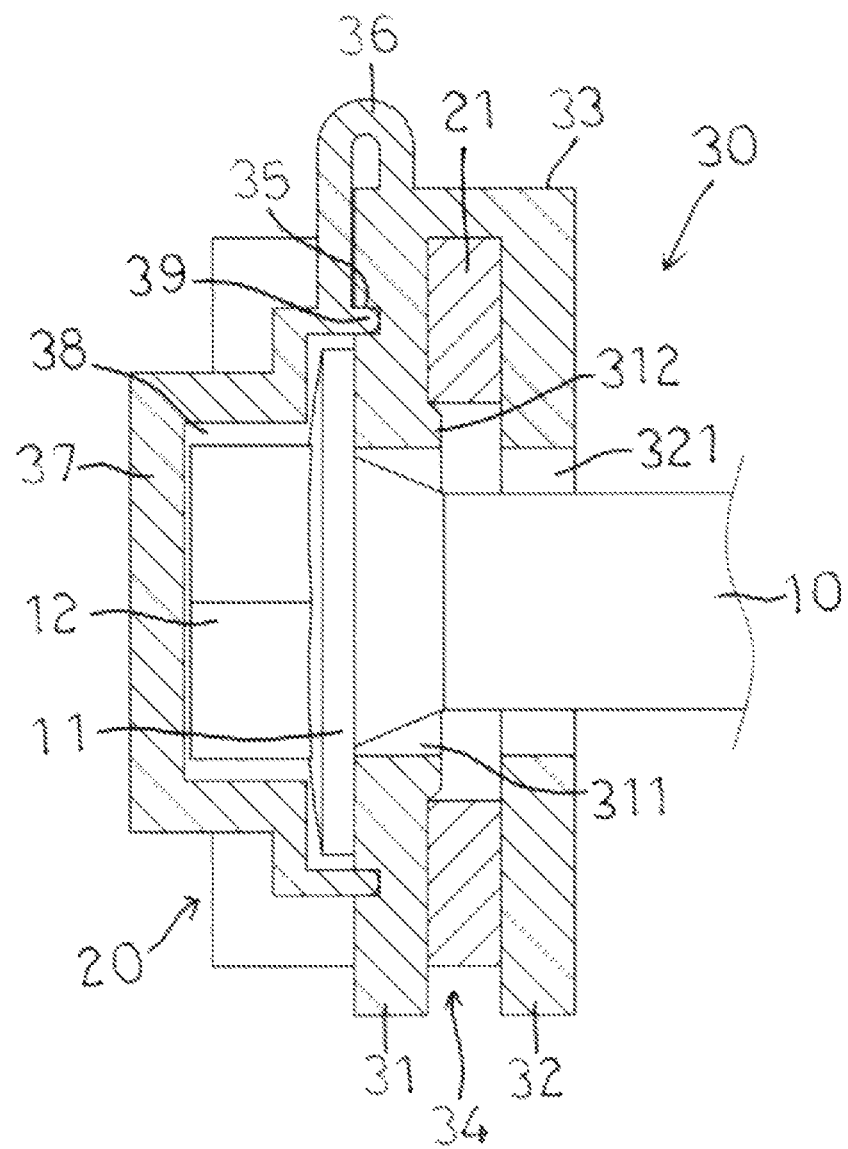
FIG. 9 is a cross-sectional assembly view of the thermally insulating fixture in accordance with the preferred embodiment of the present invention.

Referring to FIGS. 7-9 with reference to FIGS. 1-6, the thermally insulating member 30 has a substantially inverted U-shaped cross-sectional profile and includes a first coating layer 31, a second coating layer 32, and a connecting portion 33. The first coating layer 31 of the connecting portion 33 has a planar inner face and a planar outer face. The second coating layer 32 of the connecting portion 33 has a planar inner face and a planar outer face. The connecting portion 33 connects the first coating layer 31 and the second coating layer 32. The thermally insulating member 30 has an embedding slot (or groove) 34 defined between the first coating layer 31 and the second coating layer 32. The embedding slot 34 has a thickness flush with that of the sheet plate 21. The sheet plate 21 is sandwiched between the first coating layer 31 and the second coating layer 32 and is inserted into the embedding slot 34. The first coating layer 31 is provided with a first perforation 311 aligning with the through hole 22 of the sheet plate 21. The first perforation 311 of the first coating layer 31 has a circular shape and has a diameter smaller than that of the through hole 22. The first coating layer 31 is provided with a conic portion 312 locked in the through hole 22 of the sheet plate 21. The conic portion 312 of the first coating layer 31 has an annular shape. The first coating layer 31 is provided with a positioning groove 35 corresponding to the screw head 12 and the washer 11 of the self-tapping screw 10. The positioning groove 35 of the first coating layer 31 has an annular shape and surrounds the first perforation 311. The second coating layer 32 is provided with a second perforation 321 aligning with the through hole 22 of the sheet plate 21. The second perforation 321 of the second coating layer 32 has a circular shape and has a diameter smaller than that of the through hole 22.

The self-tapping screw 10 in turn extends through the first perforation 311 of the first coating layer 31, the through hole 22 of the sheet plate 21, and the second perforation 321 of the second coating layer 32, with the screw head 12 and the washer 11 of the self-tapping screw 10 protruding from the first coating layer 31 of the thermally insulating member 30. The diameter of the washer 11 is greater than that of the first perforation 311 and that of the second perforation 321.

A connecting member 36 has a first end connected with the connecting portion 33 of the thermally insulating member 30 and a second end connected with a thermally insulating cover 37. The connecting member 36 is made of flexible material. Preferably, the thermally insulating cover 37, the connecting member 36, and the connecting portion 33 of the thermally insulating member 30 are formed integrally. The thermally insulating cover 37 is detachably mounted on the first coating layer 31 of the thermally insulating member 30 and covers the screw head 12 and the washer 11 of the self-tapping screw 10. The thermally insulating cover 37 has an interior provided with a receiving space 38 accommodating the screw head 12 and the washer 11 of the self-tapping screw 10. The thermally insulating cover 37 has a periphery provided with a positioning flange 39 positioned in the positioning groove 35 of the thermally insulating member 30 when the thermally insulating cover 37 is mounted on the thermally insulating member 30 and covers the screw head 12 and the washer 11 of the self-tapping screw 10. The positioning flange 39 has an annular shape and surrounds the receiving space 38.

Figure 10:
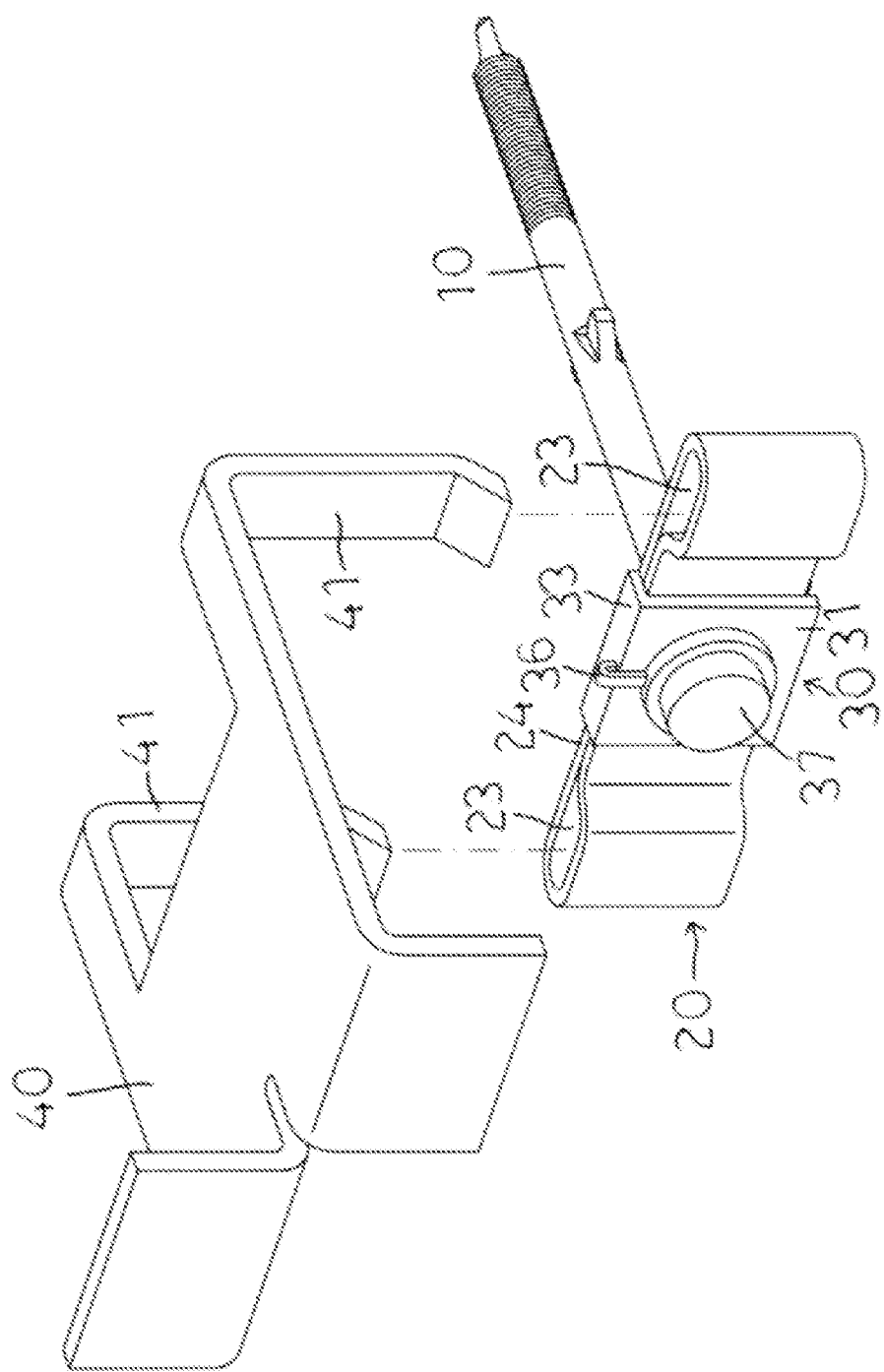
FIG. 10 is an exploded perspective view of a first fixed member and the thermally insulating fixture in accordance with the preferred embodiment of the present invention.
Figure 11:
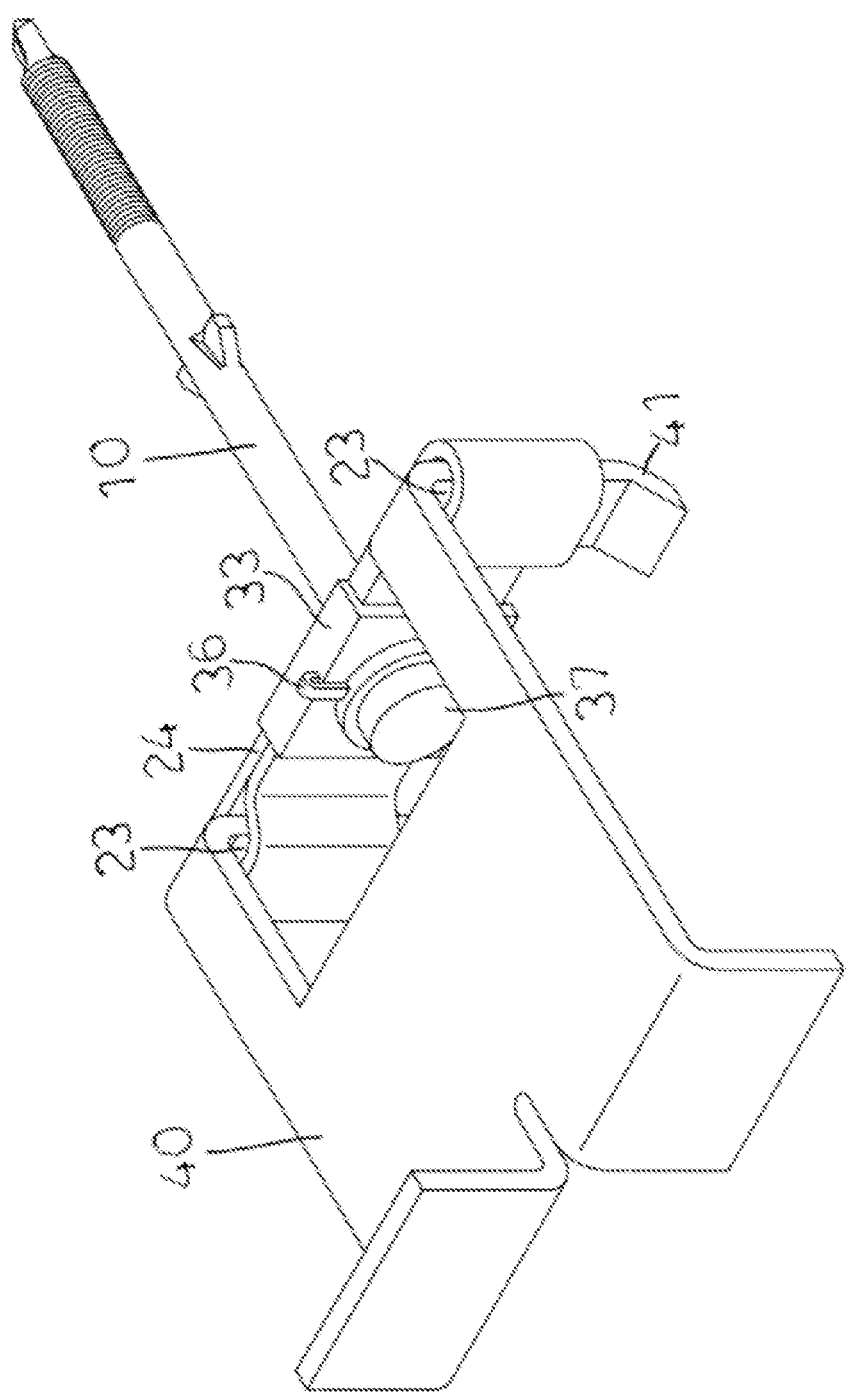
FIG. 11 is a perspective assembly view of the first fixed member and the thermally insulating fixture in accordance with the preferred embodiment of the present invention.

Referring to FIGS. 10 and 11 with reference to FIGS. 1-9, a first fixed member (or positioning rack) 40 is mounted on the support bracket 20. The first fixed member 40 includes two first fixed legs 41 inserted into the two hollow portions 23 of the support bracket 20. The two hollow portions 23 have a shape corresponding to that of the two first fixed legs 41. Preferably, the two hollow portions 23 and the two first fixed legs 41 have a flat cross-sectional shape.

Figure 12:
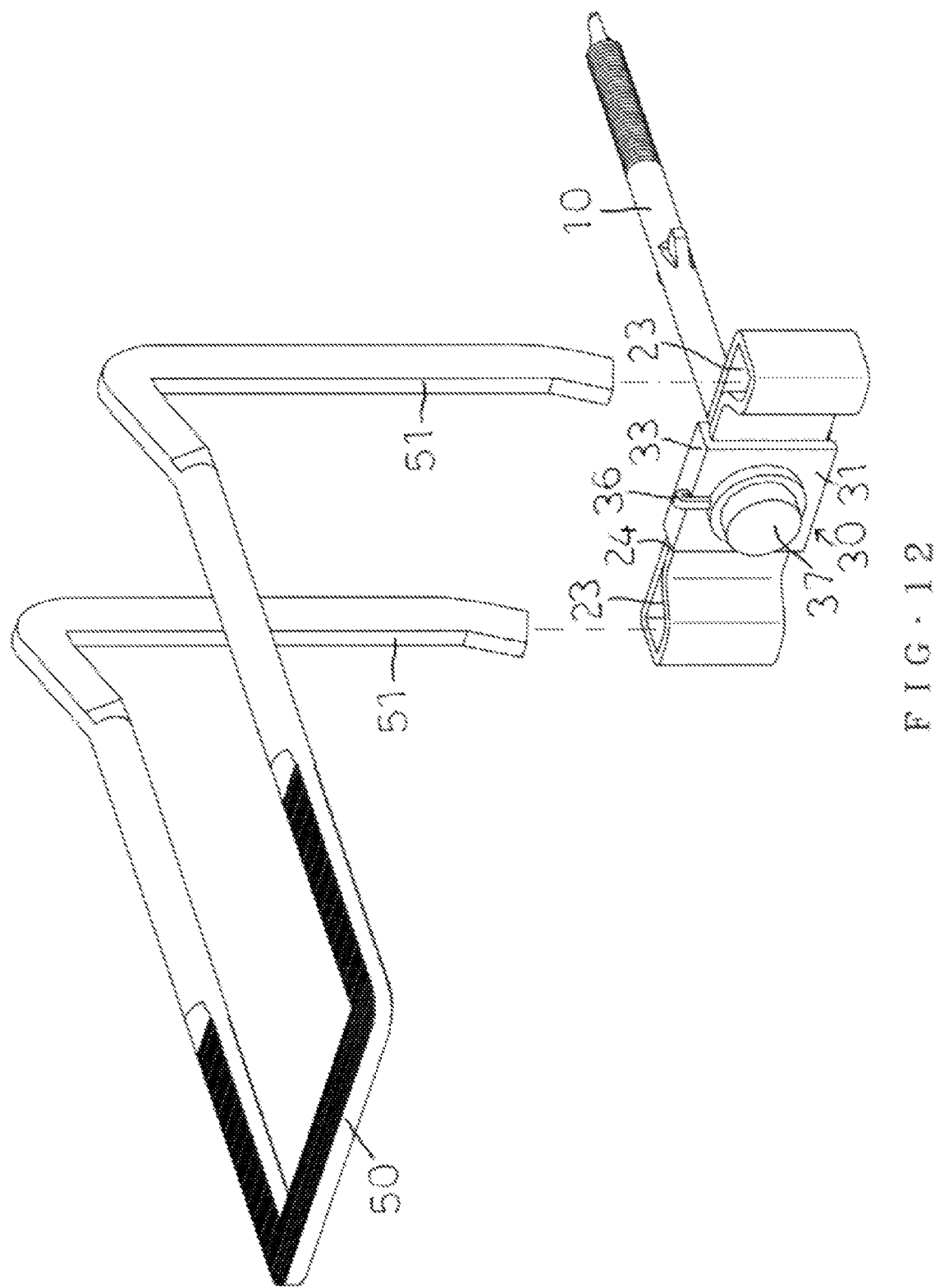
FIG. 12 is an exploded perspective view of a second fixed member and the thermally insulating fixture in accordance with the preferred embodiment of the present invention.
Figure 13:
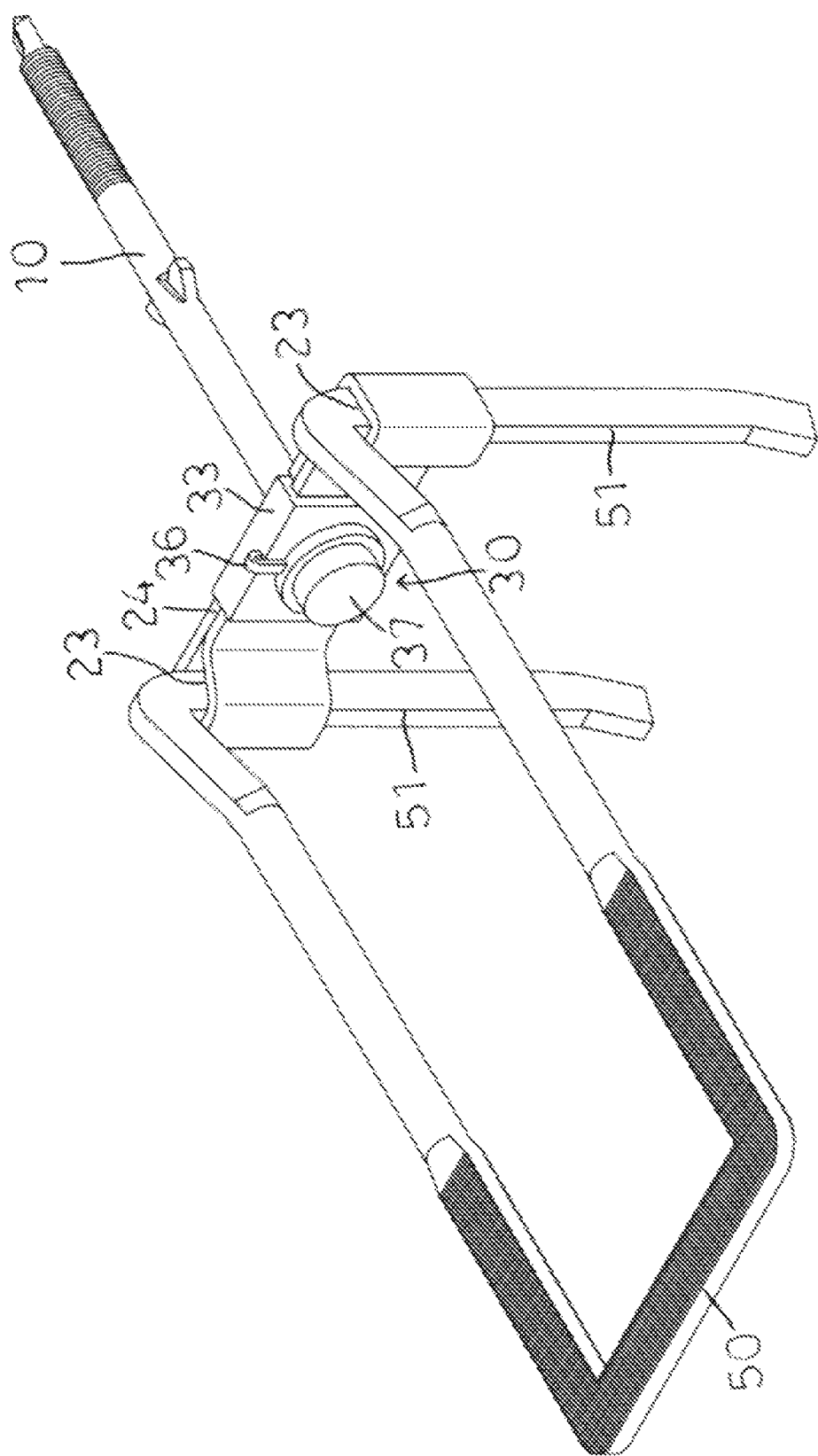
FIG. 13 is a perspective assembly view of the second fixed member and the thermally insulating fixture in accordance with the preferred embodiment of the present invention.

Referring to FIGS. 12 and 13 with reference to FIGS. 1-9, a second fixed member (or positioning rack) 50 is mounted on the support bracket 20. The second fixed member 50 includes two second fixed legs 51 inserted into the two hollow portions 23 of the support bracket 20. The two hollow portions 23 have a shape corresponding to that of the two second fixed legs 51. Preferably, the two hollow portions 23 and the two second fixed legs 51 have a rectangular cross-sectional shape.

Figure 14:
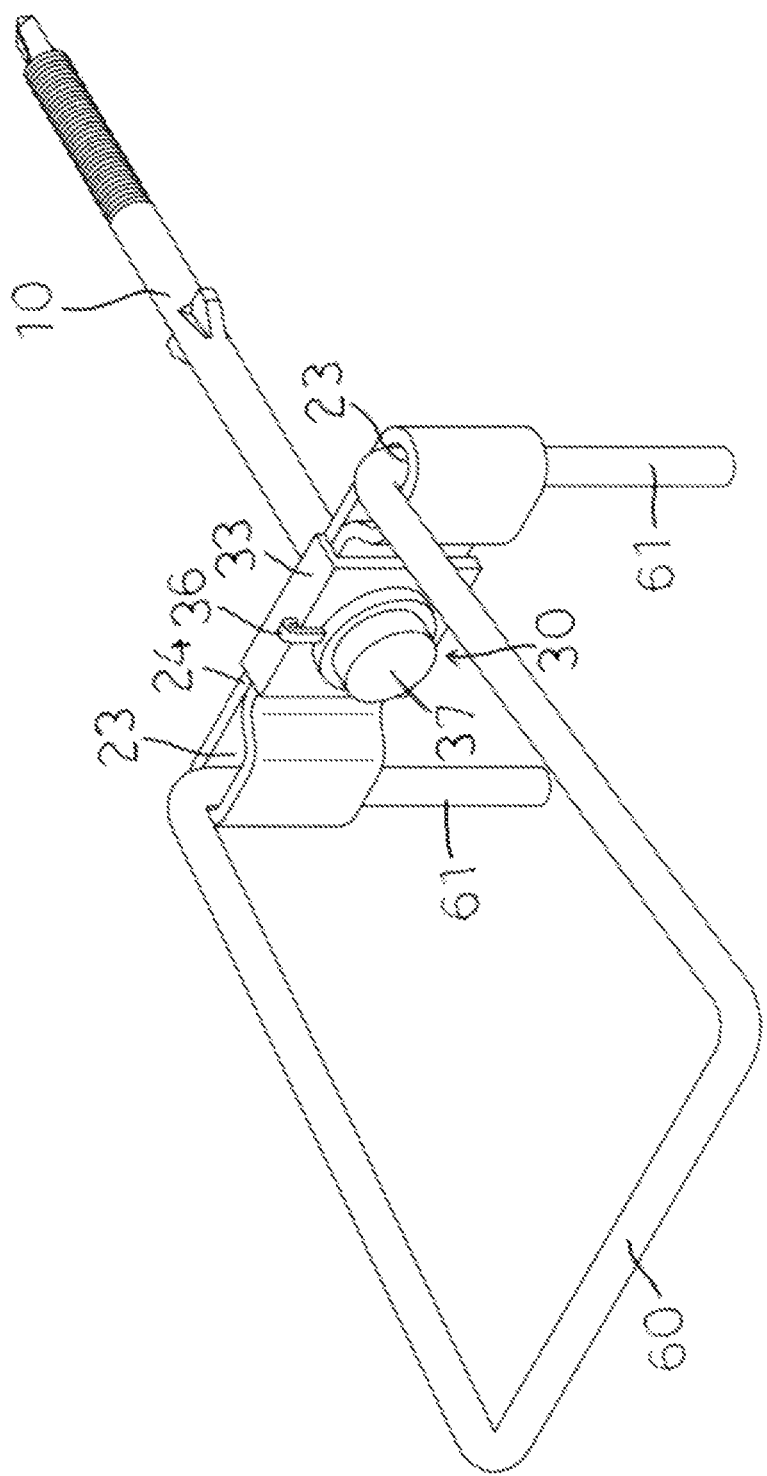
FIG. 14 is a perspective assembly view of a third fixed member and the thermally insulating fixture in accordance with the preferred embodiment of the present invention.

Referring to FIG. 14 with reference to FIGS. 1-9, a third fixed member (or positioning rack) 60 is mounted on the support bracket 20. The third fixed member 60 includes two third fixed legs 61 inserted into the two hollow portions 23 of the support bracket 20. The two hollow portions 23 have a shape corresponding to that of the two third fixed legs 61. Preferably, the two hollow portions 23 and the two third fixed legs 61 have an oblong cross-sectional shape.

Figure 15:
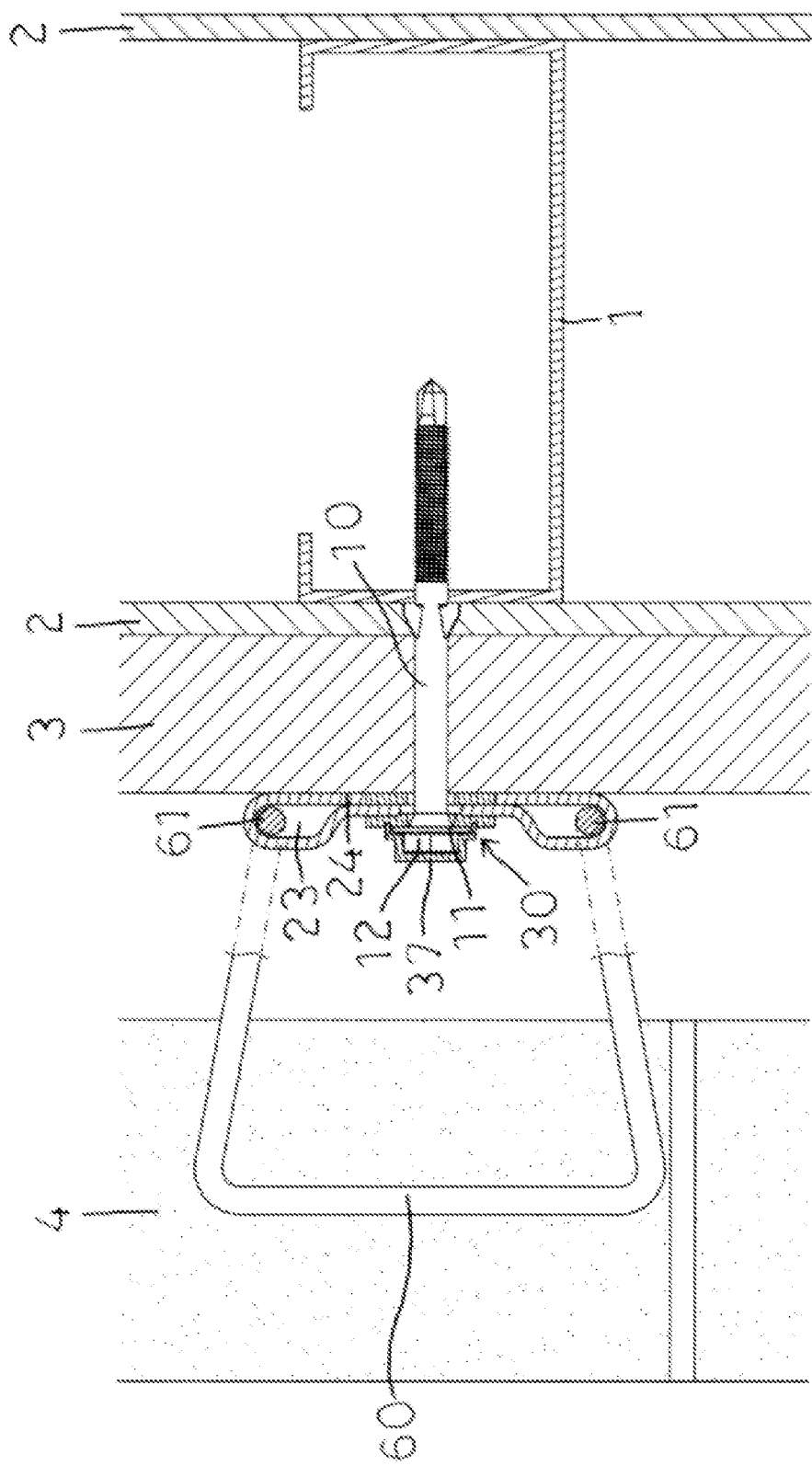
FIG. 15 is a cross-sectional assembly view of the thermally insulating fixture that is worked for a brick wall under construction.

In operation, referring to FIGS. 14-16 with reference to FIGS. 1-9, the thermally insulating fixture is worked on a brick wall. The brick wall includes two panels 2, a foam layer 3, a metal element 1, and a plurality of bricks 4. The foam layer 3 has a thermally insulating effect and is mounted on an outer one of the two panels 2. The thermally insulating member 30 together with the support bracket 20 is initially placed on the foam layer 3. Then, the driving tool (not shown) is mounted on the screw head 12 of the self-tapping screw 10 to rotate the self-tapping screw 10, so that the self-tapping screw 10 is in turn screwed through the thermally insulating member 30, the support bracket 20, and the foam layer 3 into the outer one of the two panels 2. Then, the self-tapping screw 10 is screwed into and positioned in the metal element 1 as shown in FIG. 15. Then, the thermally insulating cover 37 is mounted on the thermally insulating member 30 and covers the washer 11 and the screw head 12 of the self-tapping screw 10. Then, the third fixed member 60 is mounted on the support bracket 20, with the two third fixed legs 61 of the third fixed member 60 being inserted into the two hollow portions 23 of the support bracket 20 as shown in FIG. 14. Thus, the third fixed member 60 is hooked on the support bracket 20. Finally, the bricks 4 are paved and stacked as shown in FIG. 16.

Accordingly, the thermally insulating member 30 presses the foam layer 3 closely and tightly by the resilient ductility of the thermally insulating member 30, to provide a thermally insulating effect and to break or block a heat conduction or convection, thereby preventing the cold air in the winter or the hot air in the summer from entering the house. In addition, the thermally insulating cover 37 covers the washer 11 and the screw head 12 of the self-tapping screw 10, to enhance the thermally insulating effect. Further, the positioning flange 39 of the thermally insulating cover 37 is positioned in the positioning groove 35 of the thermally insulating member 30 when the thermally insulating cover 37 covers the self-tapping screw 10, to provide a better thermal isolating and heat preservation effect. Further, the support bracket 20 is worked easily and simply to save the cost of fabrication. Further, the thermally insulating member 30 coats the support bracket 20, and the thermally insulating cover 37 covers the self-tapping screw 10, thereby preventing the warm air in the house from being transferred outward through the support bracket 20 and the self-tapping screw 10. Further, the thermally insulating member 30 has an elastic feature to enhance the screwing and locking action of the self-tapping screw 10, such that the thermally insulating member 30 rests on the foam layer 3 smoothly and evenly.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A thermally insulating fixture comprising:
a support bracket; and
a thermally insulating member mounted on the support bracket;
wherein:
the support bracket has a middle provided with a sheet plate formed by stamping;
the sheet plate includes two hollow portions formed on two ends thereof;
each of the two hollow portions has a loop shape and is formed by bending the sheet plate;
each of the two hollow portions is provided with an abutment laminating the sheet plate;
the sheet plate is provided with a through hole;
the thermally insulating member covers an exterior of the support bracket;
the thermally insulating member includes a first coating layer, a second coating layer, and a connecting portion;
the connecting portion connects the first coating layer and the second coating layer;
the thermally insulating member has an embedding slot defined between the first coating layer and the second coating layer;
the embedding slot has a thickness flush with that of the sheet plate;
the sheet plate is sandwiched between the first coating layer and the second coating layer and is inserted into the embedding slot;
the first coating layer is provided with a first perforation aligning with the through hole of the sheet plate;
the first coating layer is provided with a conic portion locked in the through hole of the sheet plate;
the first coating layer is provided with a positioning groove;
the second coating layer is provided with a second perforation aligning with the through hole of the sheet plate;
a connecting member has a first end connected with the connecting portion of the thermally insulating member and a second end connected with a thermally insulating cover;
the thermally insulating cover is detachably mounted on the first coating layer of the thermally insulating member;
the thermally insulating cover has an interior provided with a receiving space; and
the thermally insulating cover has a periphery provided with a positioning flange positioned in the positioning groove of the thermally insulating member when the thermally insulating cover is mounted on the thermally insulating member.

2. The thermally insulating fixture as claimed in claim 1, wherein each of the two hollow portions has a flat, triangular, circular or polygonal cross-sectional profile.

3. The thermally insulating fixture as claimed in claim 1, wherein the two hollow portions are bent and encircled from a front face to a back face of the sheet plate.

4. The thermally insulating fixture as claimed in claim 1, wherein the two hollow portions are bent and encircled from a back face to a front face of the sheet plate.

5. The thermally insulating fixture as claimed in claim 1, wherein the thermally insulating member is made of plastics or rubber.

\* \* \* \* \*